US006757344B2

(12) United States Patent
Carleton

(10) Patent No.: US 6,757,344 B2
(45) Date of Patent: Jun. 29, 2004

(54) APPARATUS AND METHOD FOR MEASURING SUB-CARRIER FREQUENCIES AND SUB-CARRIER FREQUENCY OFFSETS

(75) Inventor: Gregory C. Carleton, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 184 days.

(21) Appl. No.: 10/145,792

(22) Filed: May 16, 2002

(65) Prior Publication Data

US 2002/0181617 A1 Dec. 5, 2002

Related U.S. Application Data

(60) Provisional application No. 60/294,922, filed on May 31, 2001.

(51) Int. Cl.[7] .............................. H04L 27/06; H04J 11/00
(52) U.S. Cl. ....................................... 375/341; 370/208
(58) Field of Search ................................. 370/232, 412; 375/260, 326, 344, 355–375; 455/182.2

(56) References Cited

U.S. PATENT DOCUMENTS

| 6,141,317 | A  | * | 10/2000 | Marchok et al. ............. | 370/208 |
| 6,198,782 | B1 | * | 3/2001  | De Courville et al. ....... | 375/341 |
| 6,219,333 | B1 |   | 4/2001  | Ahn ............................. | 370/203 |
| 6,424,986 | B1 | * | 7/2002  | Li et al. ....................... | 708/400 |
| 6,459,679 | B1 | * | 10/2002 | Kim ............................. | 370/208 |
| 6,459,745 | B1 | * | 10/2002 | Moose et al. ................ | 375/355 |
| 6,546,055 | B1 | * | 4/2003  | Schmidl et al. .............. | 375/244 |
| 6,546,056 | B1 | * | 4/2003  | Rosenlof ..................... | 375/260 |
| 6,584,111 | B1 | * | 6/2003  | Aweya et al. ................ | 370/412 |

FOREIGN PATENT DOCUMENTS

| EP | 0858179 | 2/1998 | .............. H04J/1/05 |
| EP | 0877526 | 5/1998 | .......... H04N/5/455 |

OTHER PUBLICATIONS

Cody, Mac A; The Wavelet Packet Transform Extending the Wavelet Transform; orginally appeared in Dr. Dobb's Journal, Apr., 1994. Copyright ©1994, M&T Publishing Inc., Miller Freeman Publishing, Inc.,; preprint created by permission. Corrections made by the author.

Strang, Gilbert; Appendix 1; Wavelets; American Scientist 82 (Apr. 1994), pp. 250–255.

Cirpan, Hakan A.; Tsatsanis, Michail K. ; Maximum Likelihood Blind Channel Estimation in The Presence of Doppler Shifts; IEEE Transactions on signal Processing, vol. 47, No. 6, Jun. 1999, pp. 1559–1569.

(List continued on next page.)

*Primary Examiner*—Stephen Chin
*Assistant Examiner*—Lawrence Williams

(57) ABSTRACT

Systems and methods are provided for identifying frequency offsets which may for example have been introduced after a signal has been transmitted over a wireless channel. The method involves sampling a received signal having an input bandwidth to generate a respective set of samples for each of a plurality of symbol periods; filtering the sets of samples using DWPT (discrete wavelet packet transform) filters to produce a plurality of sub-sampled outputs, the sub-sampled outputs each having a respective fraction of the input bandwidth; for each of the sub-sampled outputs, performing a narrowband FFT on the sub-sampled output produced over a plurality of symbol periods to generate a respective set of frequency domain samples; processing each set of frequency domain samples to determine at least one respective frequency offset.

20 Claims, 4 Drawing Sheets

OTHER PUBLICATIONS

Forsberg, Flemming; Oung, Harry; Needleman, Laurence; Doppler Spectral Estimation Using Time–Frequency Distributions; IEEE Transactions on Ultrasonics, Ferroelectrics, and Frequency Control, vol. 46, No. 3, May 1999, pp. 595–608.

Li, Ye (Geoffrey); Seshadri, Nambirajan; Ariyavisitakul, Sirikiat; Channel Estimation For OFDM Systems with Transmitter Diversity in Mobile Wireless Channels; IEEE Journal on Selected Areas in Communications, vol. 17, No. 3, Mar. 1999, pp. 461–471.

Giannetti, Filippo; Luise, Marco; Reggiannini, Ruggero; Simple Carrier Frequency Rate–of–Change Estimators; IEEE Transactions on Communications, vol. 47, No. 9, Sep. 1999, pp. 1310–1314.

Niu, X.X.; Chan, Y.T.; Wavelet Based Approach for Joint Time Delay and Doppler Stretch Measurements; IEEE Transactions on Aerospace and Electronic Systems, vol. 35, No. 3, Jul. 1999, pp. 1111–1119.

Bar–David, I.; Elia, A.; Incremental Frequency, Amplitude and Phase Tracker (IFAPT) for Coherent Demodulation Over Fast Flat Fading Channels; IEEE Communications Letters, vol. 3, No. 11, Nov. 1999, pp. 314–316.

Hong, Woonpyo; A Frequency Offset Estimation Architecture of OFDM System in Multipath Doppler Spread Channel; IEEE, 1999, pp. 1071–1075.

Simoens, Sebastien; Buzenac, Veronique; de Courville, Marc; A New Method for Joint Cancellation of Clock and Carrier Frequency Offsets in OFDM Receivers Over Frequency Selective Channels.

Mazzenga, Franco; Corazza, Giovanni Emanuele; Blind Least–Squares Estimation of Carrier Phase, Doppler Shift, and Doppler Rate for m–PSK Burst Transmission, IEEE, 1998, pp. 73–75.

Chang, Sekchin; Powers, Edward.; Blind Estimation of Frequency Offset in OFDM Systems Using a Nonlinear Adaptive Filter; IEEE, 2000, pp. 917–921.

Visser, Matthijs A.; Zong, Pingping; Bar–Ness, Yeheskel; A Novel Method for Blind Frequency Offset Correction OFDM System; IEEE, 1998, pp. 816–820.

Kaasila, Veli–Pekka; Performance Analysis of an OFDM System Using Data–Aided Channel Estimation; IEEE, 1999, pp. 2303–2307.

Van de Beek, Jan–Jaap; Borjesson, Per Ola; Boucheret, Marie–Laure; Landstrom, Daniel; Arenas, Julia Martinez; Odling, Per; Ostberg, Christer; Wahlqvist, Mattias; Wilson, Sarah Kate; A Time and Frequency Synchronization Scheme for Multiuser OFDM; IEEE Journal on Selected Areas in Communications, vol. 17, No. 11, Nov. 1999, pp. 1900–1914.

Hsieh, Meng–Han; Wei, Che–Ho; A Low–Complexity Frame Synchronization and Frequency Offset Compensation Scheme for OFDM Systems Over Fading Channels; IEEE Transactions on Vehicular Technology, vol. 48, No. 5, Sep. 1999, pp. 1596–1609.

Crestel, J.; Emile, B.; Guitton, M.; Menard D.; A Doppler Frequency Estimate Using the Instantaneous Frequency; IEEE, 1977, pp. 777–780.

Leung, Edward; Ho, Paul; A Successive Interference Cancellation Scheme for an OFDM System; IEEE, 1998, pp. 375–379.

Ho, K.C.; Chan, Y.T.; Optimum Discrete Wavelet Scaling and Its Application to Delay and Doppler Estimation; IEEE Transactions on Signal Processing, vol. 46, No. 9 Sep. 1998, pp. 2285–2290.

Giunta, Gaetano; Fast Estimators of Time Delay and Doppler Stretch Based on Discrete–Time Methods; IEEE Transactions on Signal Processing, vol. 46, No. 7, Jul. 1998, pp. 1785–1797.

Jakobsson, Andreas; Swindlehurst, A.; Stoica, Petre; Subspace–Based Estimation of Time Delays and Doppler Shifts; IEEE Transactions on Signal Processing, vol. 46, No. 9, Sep. 1998, pp. 2472–2482.

* cited by examiner

APPARATUS AND METHOD FOR MEASURING SUB-CARRIER FREQUENCIES AND SUB-CARRIER FREQUENCY OFFSETS

RELATED APPLICATIONS

This application claims the benefit of provisional application No. 60/294,922 filed May 31, 2001.

FIELD OF THE INVENTION

The present invention relates to sub-carriers within signals and, more specifically, to measuring sub-carrier frequencies and sub-carrier frequency offsets.

BACKGROUND OF THE INVENTION

Within a wireless network, such as an Orthogonal Frequency Division Multiplexed (OFDM) network, there are a number of situations in which undesirable frequency offsets can be introduced to a signal between the signal's transmission, for example from a Base Transceiver Station (BTS), and signal reception, for example at a Mobile Station (MS). For instance, one effect in which a frequency offset may be introduced, commonly known as the Doppler Effect, results from a MS changing locations while communicating with a BTS, this movement causing a change in the trajectory of signals arriving at the antenna of the MS. Further, undesired frequency offsets between transmitted signal frequencies and the frequencies at which signals are recovered may be introduced by clock variations within the Analog-to-Digital Converters (ADC)of the MS or by slight differences in frequencies between the oscillators of the transmitter within the BTS and the receive within the MS.

The result of these introduced frequency offsets is a constellation rotation during the recovery of the signals which can cause errors in the recovered sub-carriers and hence an increase in the Bit Error Rate (BER) for the system. This problem becomes even more significant in cases in which the sub-carriers form part of larger, more complex constellations.

There are well-known techniques for introducing frequency offsets in cases that the frequency offsets are predetermined fixed values. For instance, frequency offsets are purposely introduced with Automatic Frequency Control (AFC) systems implemented within Frequency Modulation (FM) radio broadcast receivers. Unfortunately, the frequency offsets resulting within a wireless network discussed above, such as those due to the Doppler Effect, are not predetermined fixed values but rather are variable values. There are currently no known techniques for measuring these frequency offsets.

SUMMARY OF THE INVENTION

One broad aspect of the invention provides a method of identifying frequency offsets which may for example have been introduced after a signal has been transmitted over a wireless channel. The method involves sampling a received signal having an input bandwidth to generate a respective set of samples for each of a plurality of symbol periods; filtering the sets of samples using DWPT filters to produce a plurality of sub-sampled outputs, the sub-sampled outputs each having a respective fraction of the input bandwidth; for each of the sub-sampled outputs, performing a narrowband FFT on the sub-sampled output produced over a plurality of symbol periods to generate a respective set of frequency domain samples; processing each set of frequency domain samples to determine at least one respective frequency offset.

In some embodiments, the received signal has a plurality N of sub-carriers, and N samples per symbol period are taken.

In some embodiments, the received signal is an OFDM signal having a plurality N of evenly spaced sub-carriers, and the symbol periods are OFDM symbol periods. In this case, sampling a received signal having an input bandwidth to generate a respective set of samples for each of a plurality of symbol periods comprises obtaining N samples per OFDM symbol period as the respective set of samples.

In some embodiments, filtering the sets of samples using DWPT filters to produce a plurality of sub-sampled outputs, the sub-sampled outputs each having a respective fraction of the input bandwidth involves filtering the sets of samples using first through Wth stages of DWPT filters in sequence.

The first through Wth stages of DWPT filters may for example collectively comprise DWPT filter stage w, w=1, . . . ,W wherein the wth filter stage comprises $2^w$ DWPT filters each having a bandwidth $1/(2^w)\times$input bandwidth, with the bandwidth of the $2^w$ filters in each stage collectively covering the input bandwidth, each of the $2^W$ filters in the wth stage outputting a $N/2^W$ samples of a respective one of said sub-sampled outputs.

In some embodiments, for each of the sub-sampled outputs, performing a narrowband FFT on the sub-sampled output produced over a plurality of symbol periods to generate a respective set of frequency domain samples involves performing a narrowband FFT on N samples of the sub-sampled output collected over $2^W$ symbol periods, wherein the respective set of frequency domain samples comprises N frequency domain samples.

In some embodiments, processing each set of frequency domain samples to determine at least one respective frequency offset involves determining $N/2^W$ frequency offsets per set of frequency domain samples.

In some embodiments, determining $N/2^W$ frequency offsets per set of frequency domain samples involves for each sub-carrier of the OFDM signal, identifying a maximum frequency domain sample in a respective sub-range of one of the sets of frequency domain samples and associating the maximum frequency domain with a respective frequency offset value.

In some embodiments, the method further involves performing an FFT on each set of samples to produce wideband frequency domain samples for each symbol period; and correcting each wideband frequency sample with one of said frequency offsets.

In some embodiments, for each of the sub-sampled outputs, performing a narrowband FFT on the sub-sampled output produced over a plurality of symbol periods to generate a respective set of frequency domain samples is done every symbol period using the sub-sampled output produced over the most recent plurality of symbol periods.

In some embodiments, for each of the sub-sampled outputs, performing a narrowband PUT on the sub-sampled output produced over a plurality of symbol periods to generate a respective set of frequency domain samples is done once every plurality of symbol periods using completely new sub-sampled output produced over the most recent plurality of symbol periods.

Another broad aspect of the invention provides an apparatus having a receiver for receiving a received signal having an input bandwidth and generating a respective set of samples for each of a plurality of symbol periods; a set of DWPT filters for filtering the sets of samples to produce a plurality of sub-sampled outputs, the sub-sampled outputs each having a respective fraction of the input bandwidth; for each of the sub-sampled outputs, a respective narrowband FFT function for performing an FFT on the sub-sampled output produced over a plurality of symbol periods to generate a respective set of frequency domain samples; and frequency offset logic adapted to process each set of frequency domain samples to determine at least one respective frequency offset.

Advantageously, in some embodiments the DWPT method computes accurate (least squares sense) frequency offset estimates deterministically, in a prescribed number of operations, without iterative convergence problems, and with only linear functions and operations. The DWPT method orthogonalizes received OFDM sub-carriers and remedies shifted phase error. By providing successive frequency offset results, the DWPT yields Doppler rate or frequency shift rate of received sub-carriers. The DWPT method can resolve frequency shift offset to any level of precision by increasing the number of filter/subsampling stages. The DWPT method causes an improvement of signal-to-noise ratio (SNR) in each successive filter/subsampling stage, since the FFT cell bandwidth is halved removing half of the accompanying noise. This rise in SNR is advantageous in identifying the true subcarrier or center frequency within any of the plurality of FFT sub-bands.

Other aspects and advantageous features of the present invention will become apparent to those ordinarily skilled in the art upon review of the following description of specific embodiments of the invention in conjunction with the accompanying figures.

BRIEF DESCRIPTION OF THE FIGURES

Preferred embodiments of the present invention will now be described in detail with reference to the following figures.

DETAILED DESCRIPTION OF THE PREFERRED EMBODIMENTS

Figure 1:
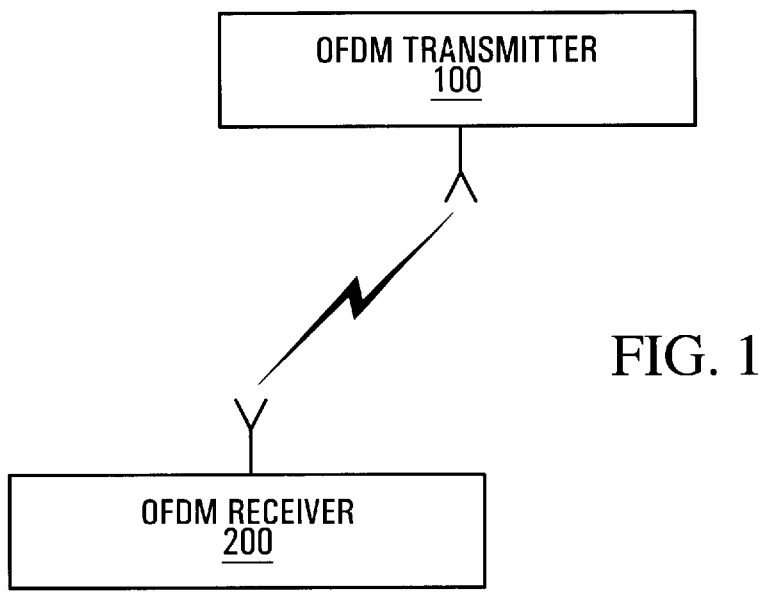
FIG. 1 illustrates a block diagram of a wireless network in which the present invention could be implemented.

FIG. 1 is a block diagram of a wireless network in which the present invention could be implemented. An OFDM transmitter 100 is shown communicating with an OFDM receiver 200 in motion via a wireless link. In this situation, it is possible that the Doppler Effect caused by the movement of the OFDM receiver 200 could result in a frequency offset between the frequency of the signals transmitted from the OFDM transmitter 100 and the frequency at which these signals are received at the OFDM receiver 200. If not compensated for, this frequency offset could result in an increased BER for the signals being received at the OFDM receiver 200. More generally, embodiments of the invention may be used to correct for carrier synchronization errors, and frequency instabilities such as in local oscillators, transmitter oscillators and A/D converter oscillators, including drift due to thermal effects, aging, and power supply variation. By orthogonalizing OFDM sub-carriers, the DWPT lowers BER of high-density digital data symbols.

Figure 2:
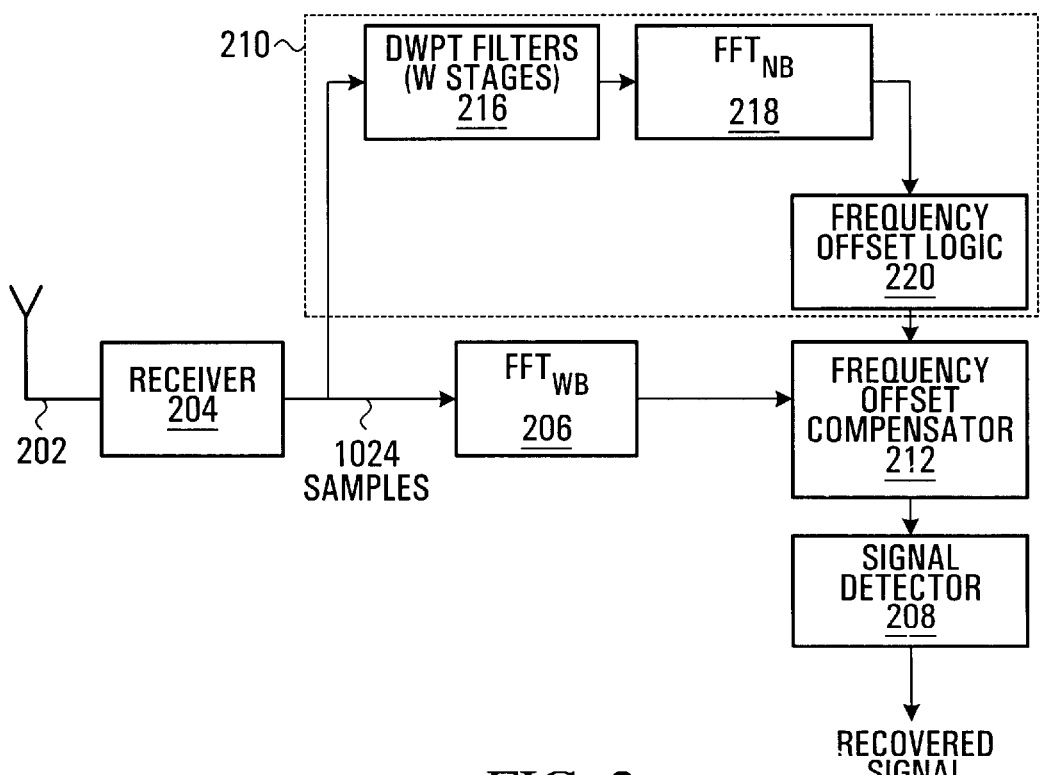
FIG. 2 illustrates a block diagram of the mobile station of FIG. 1 according to an embodiment of the present invention.

FIG. 2 is a block diagram of the OFDM receiver 200 according to an embodiment of the present invention. As shown, the OFDM receiver 200 comprises an antenna 202 coupled in series with a receiver 204, a wide-band Fast Fourier Transform (FFT$_{WB}$) function 206, a frequency offset compensator 212 and a signal detector 208. Also included within the OFDM receiver 200, according to an embodiment of the present invention, is a frequency offset measurement apparatus 210 coupled to the receiver 204 and the frequency offset compensator 212.

In operation, the antenna 202 receives transmitted signals from the OFDM transmitter 100. The receiver 204 subsequently performs initial processing on the received signals to produce a sequence of samples of the received signals by sampling the each received OFDM symbol to produce a number N of samples equal to the number of sub-carriers in the OFDM symbol. For example, if there are N=1024 sub-carriers, then 1024 time domain samples per OFDM symbol period are generated at the receiver 204. Guard intervals may also be employed. These N samples per symbol period are forwarded to both the FFT$_{WB}$ function 206 and the frequency offset measurement apparatus 210. The FFTWB function 206 recovers the received signal sub-carriers by performing an N point FFT on the samples for each symbol period to produce N sub-carriers. These received sub-carriers are output to the frequency offset compensator 212. The frequency offset measurement apparatus 210 measures the frequency differences between the frequency at which the sub-carriers are input to the apparatus 210 compared to a frequency at which the signal detector 208 expects the sub-carriers to be located. The output of the apparatus 210 is a value for the frequency offset of each sub-carrier, and these frequency offsets are input to the frequency offset compensator 212. The frequency offset compensator 212 adjusts frequency domain samples received from the FFT$_{WB}$ function 206 by the frequency offsets received from the frequency offset measurement apparatus 210 and outputs signals with corrected sub-carriers to the signal detector 208. The signal detector 208 then extracts the content of the sub-carriers to produce the recovered signal.

In one embodiment, the frequency offset-shifting being performed within the frequency offset compensator 212 is done by multiplying each received sub-carrier output by the FFTWB function 206 by a respective phase term which accounts for the frequency offset. For example, if $S_{c,k}$ represents the kth corrected sub-carrier, $S_{r,k}$ is the kth received sub-carrier, $f_k$ is the frequency offset for the kth received sub-carrier and N is the number of total sub-carriers transmitted, $S_{c,k}$ can be determined in the frequency offset compensator 212 according to:

$$S_{c,k} = S_{r,k} \exp\left(-j\frac{2\pi f_k}{N}\right)$$

In this case, the received sub-carrier $S_{r,k}$ can be represented by the following formula:

$$S_{r,k} = A_k \exp\left(j\frac{2\pi f_r}{N} + \phi_k^*\right)$$

where $A_k$ is the amplitude of the kth received sub-carrier, $f_r$ is the frequency of the received sub-carrier and $\phi_k^*$ is the phase of the kth received sub-carrier.

The frequency offset measurement apparatus 210, according to one embodiment as depicted in FIG. 2, comprises W stages of Discrete Wavelet Packet Transform (DWPT) filters 216 coupled to the receiver 204, a set of $FFT_{NB}$ functions 218 having an output coupled to a frequency offset logic block 220 which is further coupled to the frequency offset compensator 212.

There may also be provided an input buffer (not shown) between the receiver 204 and the DWPT filters 216 which is large enough to contain the time domain samples generated by the receiver 204 during one OFDM symbol period, i.e. of size N.

The DWPT filters 216 are configured to perform a series of W stages with the filters of each stage having one half the bandwidth of the previous stage. The filtering is applied to sets of N time domain samples output by the receiver 204 such that the resulting outputs from the final stage of filters have signals with $½^W$ the bandwidth of the original signals. The resulting outputs from the DWPT filters 216 can be considered $2^W$ sub-sampled signals each of bandwidth $½^W$ the size of the original signals. After processing by the $FFT_{NB}$ functions 218 (described below), this results in the cell resolution of the N length $FFT_{NB}$ 218 being $2^W$ finer than the output of the wideband $FFT_{WB}$ block 206. For example, if W=6, then 1/64 cell resolution is obtained.

Figure 3:
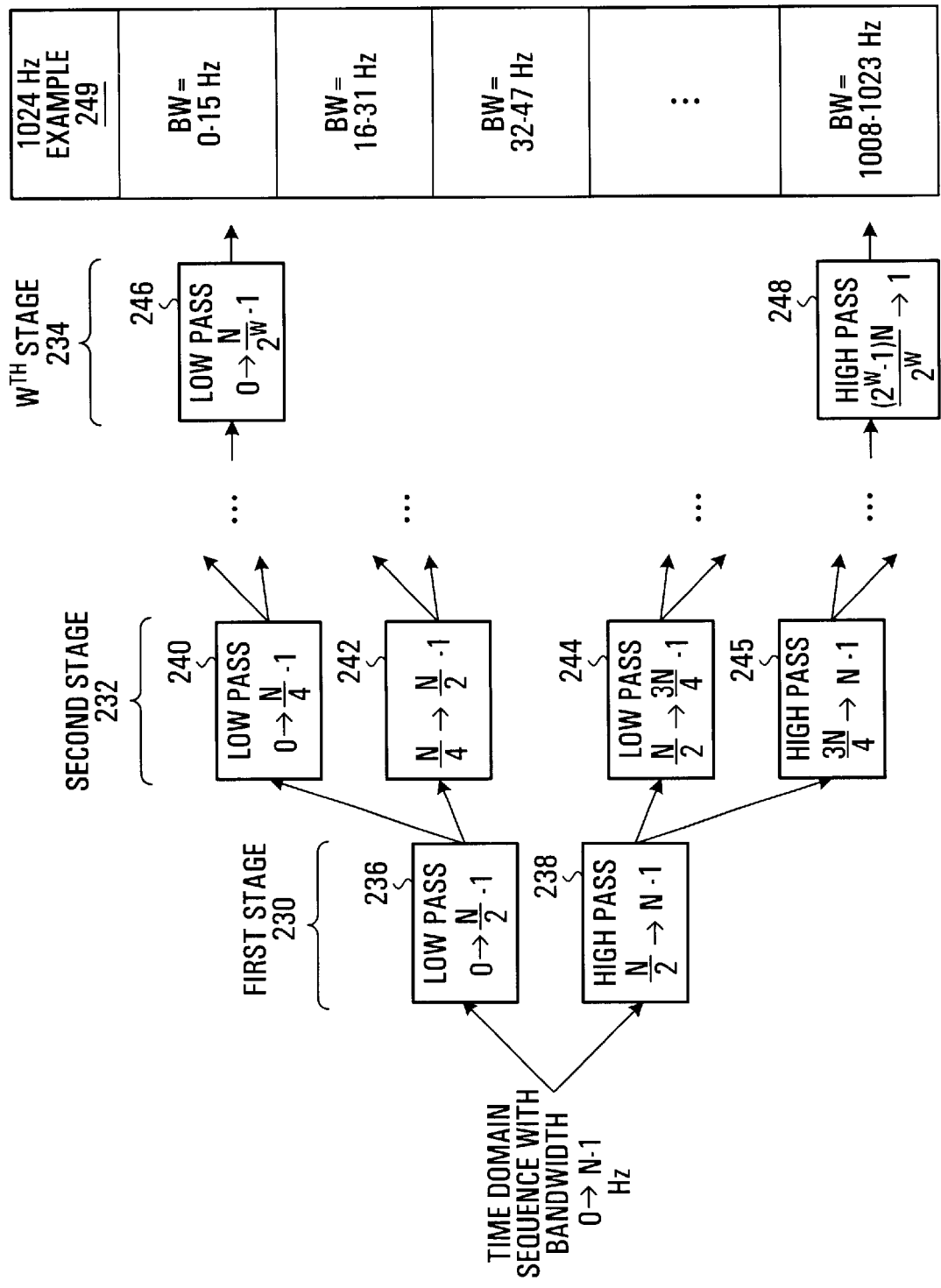
FIG. 3 illustrates an example design for the set of DWPT filters of FIG. 2.

For example, in the case that W is 6 and N=1024 such that the bandwidth of each signal output by the receiver 204 is from 0 to $(N-1)\times \Delta f$ Hz, where $\Delta f$ is the spacing between OFDM sub-carriers. In what follows, it is assumed that $\Delta f=1$ Hz. FIG. 3 illustrates the filtering that the signals received from receiver 204.

The first stage of DWPT filters 216, generally indicated by 230 filters the samples with two filters, one of which is a lowpass DWPT filter 236 having a bandwidth of 0 to N/2−1 Hz, and the other of which is a highpass DWPT filter 238 having a bandwidth of N/2 to N−1 Hz. It is noted that all wavelets in the DWPT are halfband filters, either high pass or low pass. For a given data sequence, each low pass filter has a pass band consisting of the lower half of the data spectrum. Each high pass filter has a pass band consisting of the upper half of the data spectrum. It is the combination of low pass and high pass filters that creates bandpass effects.

The outputs of the lowpass DWPT filter 236 and the highpass DWPT filter 238 are fed to the next stage of DWPT filters 216 generally indicated by 232 which consists of four filters 240,242,244,245. The output of the lowpass DWPT filter 236 is fed to a lowpass DWPT filter 240 having a passband of 0 to N/4−1 Hz and to a highpass DWPT filter 242 having a passband of N/4 to N/2−1 Hz. The output of the highpass DWPT filter 238 is fed to a lowpass DWPT filter 244 having a passband of N/2 to 3N/4−1 Hz and to a highpass DWPT filter 245 having a passband of 3N/4 to N−1 Hz.

There are W such stages in all, only the first stage 230, second stage 232, and partial details of the Wth stage 234 being shown in FIG. 3. The number of DWPT filters in each stage increases by a factor of two, with a total of $2^W$ filters in the Wth stage. The number of samples being processed by a given filter also drops by half for each stage. Thus, the number of samples output by each of the $2^W$ filters of the Wth stage is $N/2^W$ per OFDM symbol. For the case where N is 1024, and W is 6, the number of samples output by each of the filters in the Wth stage is 16. The bandwidths output by the Wth stage for N=1024, W=6 are shown generally indicated at 249.

The $FFT_{NB}$ functions 218 process each of the $2^W$ output sequences of the Wth filter stage. Logically, there is one N point narrowband FFT for each of these $2^W$ outputs. For each of the $2^W$ output sequences $N/2^W$ samples per OFDM symbol period are collected until there are a total of N samples, and these are processed by the respective narrowband FFT to produce N frequency domain samples of resolution $½^W$ that of the original OFDM symbol. Because only sequences $N/2^W$ samples per OFDM symbol period are collected, it will take $2^W$ OFDM symbol periods before enough samples are collected.

Initially, it will take $2^W$ OFDM symbol periods before enough samples are collected for the narrow band FFTs 218 to operate. After this many samples are available, in one embodiment, the narrowband FFTs 218 operate every OFDM symbol period using the data output by the filter stages over the most recent $2^W$ OFDM symbol periods. In this case, every symbol period, the oldest $N/2^W$ samples are discarded. In another embodiment, the narrowband FFTs 218 only operate every $2^W$ OFDM symbol periods on entirely new data.

Each of the $FFT_{NB}$ functions 218 is an N point FFT function such that each of the $FFT_{NB}$ functions output N frequency domain samples of respective frequency spectra of $N/2^W$ sub-carriers, with $2^W$ frequency domain samples per sub-carrier. Each $FFT_{NB}$ function produces a spectra centered at the respective bandwidth of one of the DWPT outputs. For our N=1024, W=6 example, each of the $FFT_{NB}$ functions 218 would output the spectra of 16 sub-carriers, with the spectrum of an individual sub-carrier being represented by 64 subsamples.

The outputs from the set of $FFT_{NB}$ functions 218 are input to the frequency offset logic block 220 which determines the frequency offset between an expected frequency of each sub-carriers and an actually measured frequency. In one embodiment, the frequency offset logic block 220 determines which of the subsamples for each sub-carrier spectrum has the greatest power and uses this determination to estimate the sub-carrier frequencies.

For each of the $FFT_{NB}$ functions 218, the output sample which is a maximum for each sub-carrier is identified. Recall the output of each $FFT_{NB}$ function consists of a respective spectrum of $2^W$ samples per sub-carrier, with the expected maximum being located at the center of the respective spectrum. The maximum $FFT_{NB}$ output over this respective spectrum is considered the actual sub-carrier location. Thus, for a given $FFT_{NB}$ output having indices 0 to N−1, a respective maximum is identified for each sub-range of $2^W$ indices such a sub-range being the spectrum for one sub-carrier. For the N=1024,W=6 example, a respective maximum is identified for each sub-range of 64 indices.

The estimated sub-carrier frequencies the $q^{th}$ output, (there are $2^W$ $FFT_{NB}$ outputs, one for each of q=0 to $2^W-1$) are defined to be $S_{p+b}$, where $b=q*N/2^w$, and p=0, 1, ..., $(N/2^W-1)$. Each frequency estimate $S_{p+b}$ is set to equal the frequency of the maximum identified for each sub-range of 64 indices.

The task of determining the maximum of the spectrum for each sub-carrier will now be detailed as it applies to the narrowband $FFT_{NB}$ function 218 having frequency spectrum output in the range of 0 to $N/2^W-1$ to identify the maxima for the first $2^W$ sub-carriers. A similar process is performed for each of the $2^W$ $FFT_{NB}$ functions.

For each sub-carrier, m=[0,1, 2, ..., $N/2^W-1$], the frequency offset logic 220 finds index g belonging to highest power cell within respective boundaries of g, i.e. g=arg max{$|cell(g)|^2$}. For m=0, $g \in [0, ..., 2^W-1-1]$, and for m≠0, $g \in [2^{W*}m-2^{W-1}, ..., 2^{W*}m+2^{W-1}-1]$.

More generally, for the $q^{th}$ $FFT_{NB}$, q=0, ... $2^W-1$ the estimated sub-carrier frequency is $g/2^W+(N/2^W)*q$. For a given index g thus determined, $g/2^W+(N/2^W)*q$ is the estimated sub-carrier frequency.

It is noted that the spectrum must be reversed for odd-numbered nodes, m=[0, . . . , (N/2$^W$−1) ]. This is because when data is passed through a high pass filter and subsampled, the resulting bandwidth of the output data is half of the previous data. As well, the high pass spectrum aliases back on the spectrum of the subsampled data. (This subsampling reduces the bandwidth by half, thereby introducing aliasing.) Thus the highest frequency component in the previous data now appears at the 0 Hz or 'dc' location of the subsampled data spectrum. Cell-edge symbols are shifted in same direction as adjacent cells. More specifically, in the case where a sub-carrier has been shifted by half of its bandwidth, then the sub-carrier appears equally in two adjacent FFT cells. This ambiguous situation is resolved by shifting in the same direction as for any other shifted sub-carriers. A follow-up check on BER will immediately confirm whether the choice of shift direction was correct.

The frequency estimates $S_{p+b}$ modulo $\Delta f$ (spacing between OFDM sub-carriers) represent the frequency offset that needs to be applied to the corresponding sub-carrier. In the event the sub-carrier spacing is 1 Hz as in the above example, then the fractional part of $S_{p+b}$ represents the frequency offset that needs to be applied.

In the wideband FFT$_{WB}$206, for a sub-carrier at cell $C_k$, k=(0, 1, . . . N−1), recall the $k^{th}$ received sub-carrier is defined by:

$$S_{r,k} = A_k \exp\left(j\frac{2\pi f_r}{N} + \phi_k^*\right)$$

where $A_k$ is the amplitude of the kth received sub-carrier, $f_r$ is the frequency of the received sub-carrier and $\phi_k^*$ is the phase of the kth received sub-carrier.

After offset-shifting performed in the frequency offset compensator 212 the $k^{th}$ corrected sub-carrier is:

$$S_{c,k} = S_{r,k} \exp\left(-j\frac{2\pi f_k}{N}\right)$$

For the N=1024, W=6 example, finding the above discussed process of identifying maxima can be summarized as follows:

FFT 1) In the first FFT$_{NB}$, find the cell-number containing highest power for each of the first 16 sub-carriers:
  Sub-carrier 0) This sub-carrier occurs between cells 0 and 31 (one sided spectrum at DC, all other cells have symmetry around center);
  Sub-carrier 1) This sub-carrier occurs between cells 32 and 95;
  Sub-carrier 2) This sub-carrier occurs between cells 96 and 159;
  Sub-carrier 15) This sub-carrier occurs between cells 928 and 991.

FFT 2) In the second FFT$_{NB}$, find the cell-number containing highest power for each of the second 16 sub-carriers:
  Sub-carrier 16) This sub-carrier occurs between cells 0 and 31 (one sided spectrum at DC, all other cells have symmetry around center);
  Sub-carrier 17) This sub-carrier occurs between cells 32 and 95;
  Sub-carrier 31) This sub-carrier occurs between cells 928 and 991.

This is done for all FFT$_{NB}$ functions until the $64^{th}$ FFT$_{NB}$, where we find the cell-number containing highest power for each of the last 16 sub-carriers as follows:

FFT 64) In the sixty-fourth FFT$_{NB}$, find the cell-number containing highest power for each of the sixty-fourth 16 sub-carriers:
  Sub-carrier 1008) This sub-carrier occurs between cells 0 and 31 (one sided spectrum at DC, all other cells have symmetry around center);
  Sub-carrier 1009) This sub-carrier occurs between cells 32 and 95;
  Sub-carrier 1023) This sub-carrier occurs between cells 928 and 991.

The nominal frequencies for sub-carriers at the first FFT$_{NB}$ are [0, 1, . . . , 15] Hz. The nominal frequencies for sub-carriers at the second FFTNB are [16, 17, . . . , 31] Hz. The nominal frequencies for sub-carriers at the third FFT$_{NB}$ are [32, 33 . . . , 63] Hz. The nominal frequencies for sub-carriers at the last FFT$_{NB}$ are [1008, . . . , 1023] Hz.

The sub-carrier frequencies at each FFT$_{NB}$ are locally 0 to 15 Hz. For example, the actual frequency for the sixth sub-carrier $S_6$ from the fourth FFT$_{NB}$ is 6+16*=6+64=70 Hz. Similarly, local S6 at the first FFT$_{NB}$ is globally $S_6$=6 Hz. Local $S_6$ at the second FFT$_{NB}$ is globally $S_{22}$=6+16=22 Hz. Local $S_6$ at the third FFT$_{NB}$ is globally $S_{38}$=6+32=38 Hz.

The discrete wavelet coefficients necessary for both low pass and high pass filtering are available from numerous sources on wavelets. Filter lengths vary, but for this case, lengths from 2 to 8 were used. Some references are: Wavelet Toolbox, The Math Works, Inc. Natick, Mass., 01760-2098 U.S.A.; Strang, Gilbert and Nguyen, Truong, "Wavelets and Filter Banks," Wellesley-Cambridge Press, 1996; Nievergelt, Yves, "Wavelets Made Easy," Birkhäuser, Boston, Mass., U.S.A., 1999.

Figure 4:
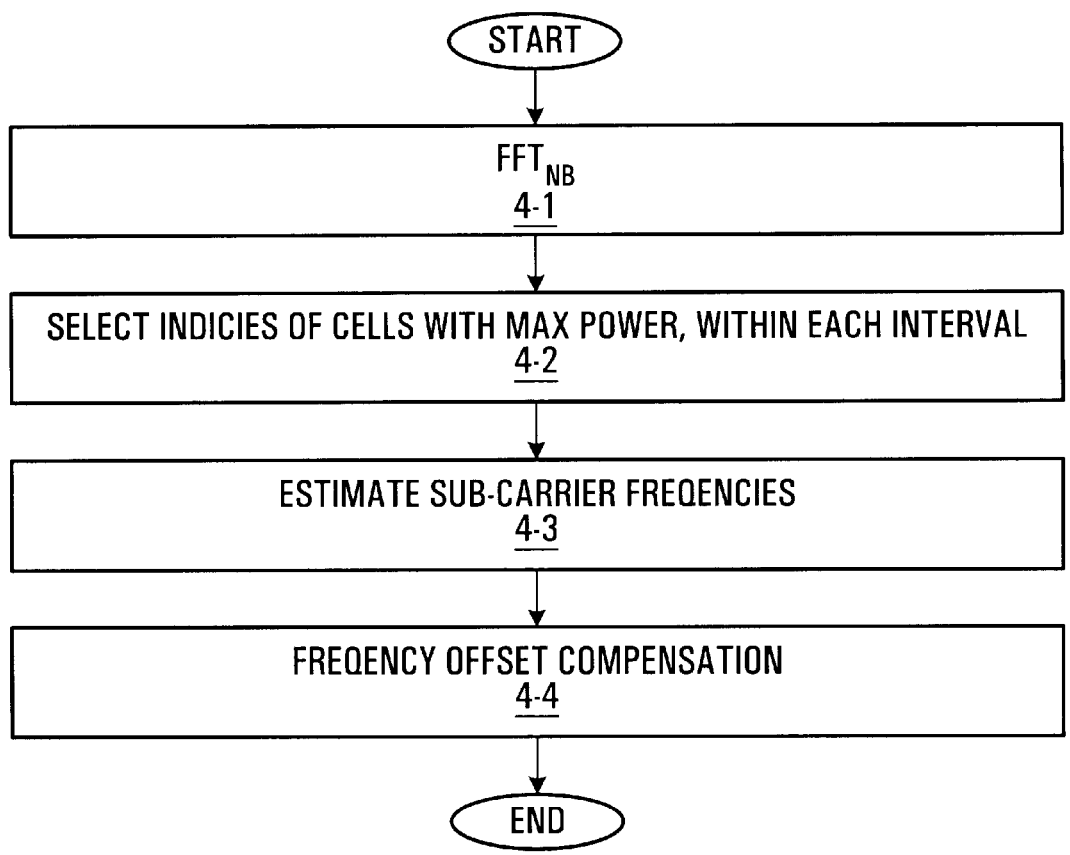
FIG. 4 details the steps performed in the frequency offset logic of FIG. 2.

The processing from the narrowband FFTs onward for a given node is summarized in FIG. 4. First, the N point narrowband FFT is performed at step 4-1. Next, the index having a maximum power of each interval are determined at step 4-2. The sub-carrier frequencies are then estimated accordingly at step 4-3. The fractional part of the sub-carrier frequency (for $\Delta f$=1 example) is the frequency offset which is applied with frequency offset compensator 212 to correct associated received sub-carrier $\{S_{r,p+b}\}$ to produce corrected received sub-carrier in step 4-4.

The implementation of the present invention can reduce the number of errors within the signal detector caused by such things as the Doppler Effect, clock variations within the ADC within the receiver 204 and differences within the oscillation frequencies within the BTS 100 and the MS 200.

It is noted that there is a trade-off when considering the value of W. The greater W is made, the more accurate the measurement of the frequency offset can be made but also the longer a wait prior to being able to measure the first iteration of the frequency offset. That is because, $2^W$ signals must be buffered before proceeding with the determination of the frequency offset.

It is noted that implementations of the present invention could have the calculation of the frequency offset made for every new signal that is received or alternatively for only when set signals are received at the MS. For instance, the measurement of the frequency offset could be done periodically or only when a pilot signal is being transmitted. Further, a diagnostic monitor could trigger the calculation of the frequency offset and the compensation of the frequency offset in times in which a signal factor exceeds a threshold, such as for example the BER increasing beyond an acceptable level.

It should further be noted that although the present invention is described above for implementation within an OFDM receiver in a wireless network, specifically an OFDM network, it should be recognized that a frequency offset measurement technique of the present invention could be implemented in other applications in which an unknown frequency offset is introduced to a system. For instance, the present invention could be implemented in to a fiber-optic network or cable network, etc. for improvements within digital signal detection apparatus such as modems and wideband receivers.

A further benefit of embodiments of the present invention is detailed channel propagation analysis which indicates non-uniform passage of certain signals in a dispersive channel and unwanted varying signal frequency changes.

A detailed example will now be presented. For this case, the OFDM receiver uses 1024 point FFT with 1 Hz cell bandwidth, and W=2 meaning each sub-sample spectrum is ¼ Hz wide.

Figure 5A:
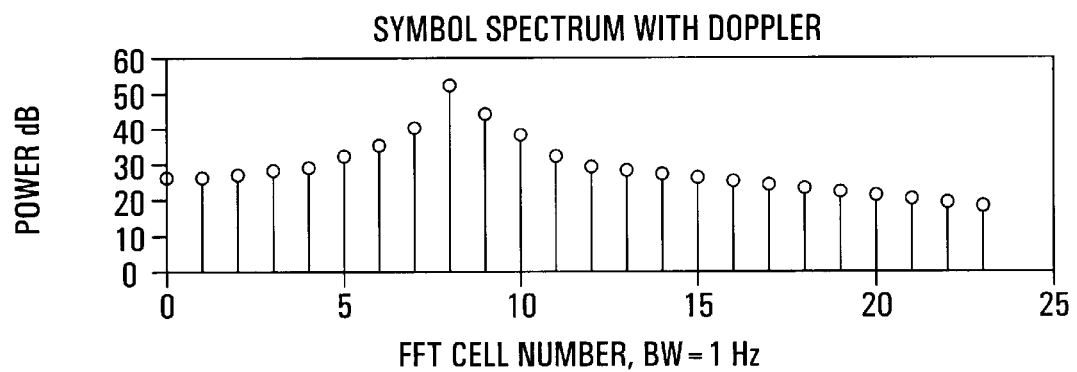
FIG. 5A and 5B are examples of a symbol spectrum with Doppler, and a symbol spectrum after wavelet filtering.

A particular modulated sub-carrier S8 at 8 Hz will appear at FFT cell 8. Suppose that this OFDM sub-carrier has 0.25 Hz Doppler offset. FIG. 5A shows the symbol spectrum (only for sub-carriers 0 to 23) at the receiver with Doppler.

Figure 5B:
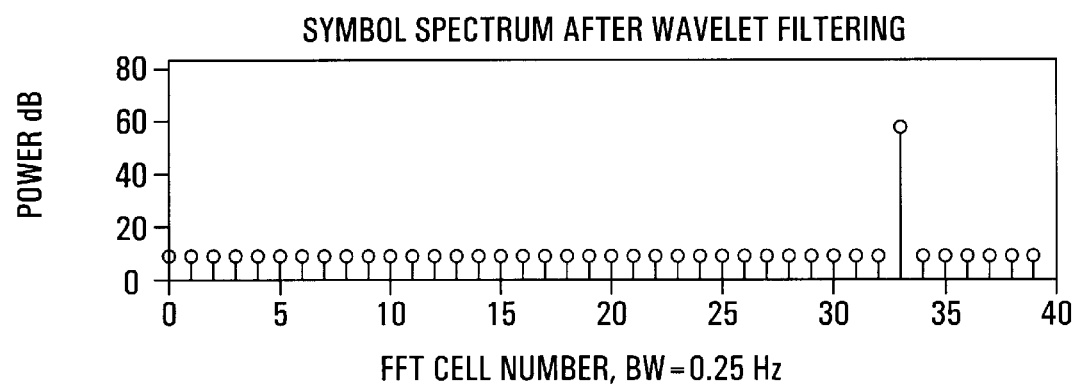

To resolve Doppler shift the method starts by low pass filter/sub-sampling 4096 samples (N×$2^W$) of the OFDM symbol. Next, a 1024 point high resolution FFT is applied to output data with a resulting cell bandwidth of 0.25 Hz. Then, it is assumed that S8 appears at cell/index 33 of the high resolution FFT output, as shown in FIG. 5B. Assuming sufficient SNR, the symbol is detectable with a frequency of 33*0.25=8.25 Hz, and more particularly, the 0.25 Hz error is detected. Now the original correct the symbol frequency by multiplying S8 with exp(−j2π(0.25)/N).

More generally, detectable signals in the High Resolution FFT appearing at cell numbers not divisible by 4 indicate a frequency offset. This can be generalized to higher binary powers.

Predicting Offset Trend

An equation for predicting offsets can be obtained by fitting a low-order curve to current measured offsets. Effects of drift in oscillator component values might appear as a linear offset β(m) where m is in months. BTS Oscillator drift due to daily temperature and aging is $$f_{obs} = (1+\beta(m))(1+\Delta f_{osc})f_{osc},$$

where $\Delta f_{osc} = \alpha \cos(2\pi t/24 + \phi)$, α is amplitude of change, φ is a seasonality component, t is hourly variable, β is a monotone temporal function and $f_{osc}$ is the ideal oscillator frequency.

Doppler offsets are assumed to have zero mean. Any long-term non-zero mean offset can attributed to BTS oscillator bias.

Persons skilled in the art will appreciate that there are alternative implementations and modifications of the present invention, and that the above described implementation is only an illustration of specific embodiments of the invention. Therefore, the scope of the invention should only be limited by the claims appended hereto.

What is claimed is:

1. A method comprising:
   sampling a received signal having an input bandwidth to generate a respective set of samples for each of a plurality of input data record periods;
   filtering the sets of samples using DWPT (Discrete Wavelet Packet Transform) filters to produce a plurality of sub-sampled outputs, the sub-sampled outputs each having a respective fraction of the input bandwidth;
   for each of the sub-sampled outputs, performing a narrowband FFT on the sub-sampled output produced over a plurality of input data record periods to generate a respective set of frequency domain samples;
   processing each set of frequency domain samples to determine at least one respective frequency offset.

2. A method according to claim 1 wherein the received signal has a plurality N of sub-carriers, and wherein:
   sampling a received signal having an input bandwidth to generate a respective set of samples for each of a plurality of input data record periods comprises N samples per input data record period as the respective set of samples.

3. A method according to claim 1 wherein the received signal comprises an OFDM signal having a plurality N of evenly spaced sub-carriers, and the input data record periods are OFDM symbol periods, and wherein:
   sampling a received signal having an input bandwidth to generate a respective set of samples for each of a plurality of input data record periods comprises obtaining N samples per OFDM input data record period as the respective set of samples.

4. A method according to claim 3 wherein:
   filtering the sets of samples using DWPT filters to produce a plurality of sub-sampled outputs, the sub-sampled outputs each having a respective fraction of the input bandwidth comprises:
   filtering and subsampling the sets of samples using first through Wth stages of DWPT filters in sequence.

5. A method according to claim 4 wherein the first through Wth stages of DWPT filters collectively comprise DWPT filter stage w, w=1, . . . , W wherein the wth filter stage comprises $2^W$ DWPT filters each having a bandwidth 1/($2^W$)×input bandwidth, with the bandwidth of the $2^W$ filters in each stage collectively covering the input bandwidth, each of the $2^W$ filters in the Wth stage outputting a N/$2^W$ samples of a respective one of said sub-sampled outputs.

6. A method according to claim 5 wherein for each of the sub-sampled outputs, performing a narrowband FFT on the sub-sampled output produced over a plurality of input data record periods to generate a respective set of frequency domain samples comprises:
   performing a narrowband FFT on N samples of the sub-sampled output collected over $2^W$ input data record periods, wherein the respective set of frequency domain samples comprises N frequency domain samples.

7. A method according to claim 6 wherein processing each set of frequency domain samples to determine at least one respective frequency offset comprises:
   determining N/$2^W$ frequency offsets per set of frequency domain samples.

8. A method according to claim 7 wherein determining N/$2^W$ frequency offsets per set of frequency domain samples comprises:
   for each sub-carrier of the OFDM signal, identifying a maximum frequency domain sample in a respective sub-range of one of the sets of frequency domain samples and associating the maximum frequency domain with a respective frequency offset value.

9. A method according to claim 1 further comprising:
   performing an FFT on each set of samples to produce wideband frequency domain samples for each input data record period;
   correcting each wideband frequency sample with one of said frequency offsets.

10. A method according to claim 1 wherein:
    for each of the sub-sampled outputs, performing a narrowband FFT on the sub-sampled output produced over a plurality of input data record periods to generate a respective set of frequency domain samples is done every input data record period using the sub-sampled output produced over the most recent plurality of input data record periods.

11. A method according to claim 1 wherein:

for each of the sub-sampled outputs, performing a narrowband FFT on the sub-sampled output produced over a plurality of input data record periods to generate a respective set of frequency domain samples is done once every plurality of input data record periods period using completely new sub-sampled output produced over the most recent plurality of input data record periods.

12. An apparatus comprising:

a receiver for receiving a received signal having an input bandwidth and generating a respective set of samples for each of a plurality of input data record periods;

a set of DWPT (Discrete Wavelet Packet Transform) filters for filtering the sets of samples to produce a plurality of sub-sampled outputs, the sub-sampled outputs each having a respective fraction of the input bandwidth;

for each of the sub-sampled outputs, a respective narrowband FFT function for performing an FFT on the sub-sampled output produced over a plurality of input data record periods to generate a respective set of frequency domain samples; and frequency offset logic adapted to process each set of frequency domain samples to determine at least one respective frequency offset.

13. An apparatus according to claim 12 wherein the received signal has a plurality N of sub-carriers, and wherein:

the receiver samples the received signal to produce N samples per symbol period as the respective set of samples.

14. An apparatus according to claim 12 wherein the received signal comprises an OFDM signal having a plurality N of evenly spaced sub-carriers, and the input data record periods are OFDM symbol periods, and wherein:

the receiver is adapted to sample the received signal to generate N samples per OFDM symbol period as the respective set of samples.

15. An apparatus according to claim 14 wherein the set of DWPT filters comprises first through Wth stages of DWPT filters in sequence.

16. An apparatus according to claim 15 wherein the first through Wth stages of DWPT filters collectively comprise DWPT filter stage w, w=1, ..., W wherein the wth filter stage comprises $2^w$ DWPT filters each having a bandwidth $1/(2^w) \times$ input bandwidth, with the bandwidth of the $2^W$ filters in each stage collectively covering the input bandwidth, each of the $2^W$ filters in the Wth stage outputting a $N/2^W$ samples of a respective one of said sub-sampled outputs.

17. An apparatus according to claim 16 wherein for each of the sub-sampled outputs, the respective narrowband FFT function performs an FFT on N samples of the sub-sampled output collected over $2^W$ symbol periods, wherein the respective set of frequency domain samples comprises N frequency domain samples.

18. An apparatus according to claim 17 wherein the frequency offset logic is adapted to processing each set of frequency domain samples to determine at least one respective frequency offset by determining $N/2^W$ frequency offsets per set of frequency domain samples.

19. An apparatus according to claim 18 wherein the frequency offset logic is adapted to determine $N/2^W$ frequency offsets per set of frequency domain samples by, for each sub-carrier of the OFDM signal, identifying a maximum frequency domain sample in a respective sub-range of one of the sets of frequency domain samples and associating the maximum frequency domain with a respective frequency offset value.

20. An apparatus according to claim 12 further comprising:

a wideband FFT function adapted to perform an FFT on each set of samples to produce wideband frequency domain samples for each input data record period;

a frequency offset compensator adapted to correct each wide band frequency sample with one of said frequency offsets.

* * * * *